US009328610B2

(12) United States Patent  (10) Patent No.: US 9,328,610 B2
Simmons et al.  (45) Date of Patent: May 3, 2016

(54) FILLING OF PARTITIONED FILM PACKAGES FOR ANCHORING SYSTEMS FOR MINES

(75) Inventors: Walter John Simmons, Martinsburg, WV (US); Walter Neal Simmons, Bahama, NC (US)

(73) Assignee: J-LOK Co., Pittsburgh, PA (US)

( * ) Notice: Subject to any disclaimer, the term of this patent is extended or adjusted under 35 U.S.C. 154(b) by 0 days.

(21) Appl. No.: 13/282,300

(22) Filed: Oct. 26, 2011

(65) Prior Publication Data

US 2012/0243946 A1  Sep. 27, 2012

Related U.S. Application Data

(60) Provisional application No. 61/407,009, filed on Oct. 26, 2010.

(51) Int. Cl.
| | |
|---|---|
| *B65B 29/10* | (2006.01) |
| *E21D 20/02* | (2006.01) |
| *C04B 40/06* | (2006.01) |
| *B65B 9/00* | (2006.01) |

(52) U.S. Cl.
CPC .............. *E21D 20/026* (2013.01); *B65B 29/10* (2013.01); *C04B 40/0666* (2013.01); *B65B 9/00* (2013.01)

(58) Field of Classification Search
CPC ..................... B65B 29/10; C04B 40/0666
USPC ........... 405/259.5, 259.6, 266, 267, 269, 288, 405/302.1; 523/130, 131; 184/98–99, 6.18
See application file for complete search history.

(56) References Cited

U.S. PATENT DOCUMENTS

| 3,324,663 | A |   | 6/1967  | McLean |
|-----------|---|---|---------|--------|
| 3,731,791 | A | * | 5/1973  | Fourcade et al. ............. 206/219 |
| 3,795,081 | A |   | 3/1974  | Brown, Jr. et al. |
| 3,861,522 | A | * | 1/1975  | Llewellyn et al. ............ 206/219 |
| 3,992,854 | A | * | 11/1976 | Howell et al. .................. 53/412 |
| 4,009,778 | A | * | 3/1977  | Howell ......................... 206/219 |
| 4,126,005 | A | * | 11/1978 | Coursen .................... 405/259.6 |
| 4,127,001 | A |   | 11/1978 | Tomic |
| 4,136,774 | A | * | 1/1979  | Ghoshal ........................ 206/219 |
| 4,221,290 | A | * | 9/1980  | Bast .............................. 206/219 |
| 4,239,105 | A |   | 12/1980 | Gilbert |
| 4,273,147 | A | * | 6/1981  | Olney .............................. 137/13 |
| 4,280,943 | A | * | 7/1981  | Bivens et al. ................. 523/505 |
| 4,516,884 | A |   | 5/1985  | Douty |
| 4,616,050 | A |   | 10/1986 | Simmons et al. |
| 4,871,283 | A | * | 10/1989 | Wright .......................... 405/263 |
| 5,361,797 | A | * | 11/1994 | Crow et al. ............. 137/101.19 |
| 5,753,861 | A | * | 5/1998  | Hansen et al. .................. 174/93 |
| 6,837,018 | B1| * | 1/2005  | Hagel et al. ..................... 52/698 |
| 7,411,010 | B2|   | 8/2008  | Kish et al. |
| 7,681,377 | B2|   | 3/2010  | Simmons et al. |
| 7,717,998 | B2| * | 5/2010  | Kanazawa et al. ............ 106/728 |
| 8,029,619 | B2| * | 10/2011 | Sato .............................. 106/790 |
| 2003/0234187 | A1 |   | 12/2003 | Paxton et al. |
| 2005/0079016 | A1 | * | 4/2005  | Greenwood et al. .......... 405/266 |
| 2008/0120947 | A1 |   | 5/2008  | Oldsen et al. |

FOREIGN PATENT DOCUMENTS

| DE | 3300410 A1 | 7/1983 |
| GB | 2113191 A  | 8/1983 |

* cited by examiner

*Primary Examiner* — Sean Andrish
*Assistant Examiner* — Patrick Lambe
(74) *Attorney, Agent, or Firm* — The Webb Law Firm

(57) ABSTRACT

A method of forming a partitioned package for grouting for an anchoring system for a mine includes pumping a mastic into the package through a fill tube while a processing lubricant is separately introduced onto an inner wall of the fill tube.

13 Claims, No Drawings

//www.w3.org/1999/xhtml">
FILLING OF PARTITIONED FILM PACKAGES FOR ANCHORING SYSTEMS FOR MINES

CROSS-REFERENCE TO RELATED APPLICATION

The benefits of Provisional Application No. 61/407,009 filed Oct. 26, 2010 by Walter John Simmons and Walter Neal Simmons and entitled "Filling of Partitioned Film Packages for Anchoring Systems for Mines" are claimed under 35 U.S.C. §119(e), and the entire contents of this application are expressly incorporated herein by reference thereto.

FIELD OF THE INVENTION

The invention relates to anchoring systems and methods of use thereof. The invention further relates to resin systems for anchoring bolts and other supports in mines.

BACKGROUND OF THE INVENTION

The primary roof support systems used in coal mines include headed rebar bolts typically 4 feet to 6 feet in length, ¾ inch and ⅝ inch in diameter, and used in conjunction with resin grouting in 1 inch diameter holes.

Multi-compartment resin cartridges are used to supply the resin grouting for the support systems. Among the cartridges known for this purpose are those disclosed in U.S. Pat. No. 3,795,081 to Brown, Jr. et al., U.S. Pat. No. 3,861,522 to Llewellyn et al., U.S. Pat. No. 4,239,105 to Gilbert, and U.S. Pat. No. 7,681,377 B2 to Simmons et al., the entire contents of each being incorporated herein by reference thereto. Cartridges typically are available in a variety of lengths ranging from 2 feet to 6 feet and in diameter from ¾ inch to ¼ inch. The cartridges also typically include two compartments: a first compartment with a reinforced, thixotropic, polyester resin mastic (a fluid) therein, and a second compartment with an organic peroxide catalyst (also a fluid) therein. The resin and catalyst are segregated from one another in order to prevent a reaction prior to puncturing of the compartments to allow contact and mixing to occur.

In use, a cartridge and bolt (or other reinforcing member) are placed in a borehole so that they abut one another. In order to puncture the cartridge so that the contents of the compartments may be released and mixed, the bolt for example may be rotated in place to shred the cartridge, thereby mixing the components and permitting solidification of the mastic. Mixing of the resin and catalyst (due to cartridge rupture as well as spinning of the bolt in the borehole) results in hardening that allows the bolt to be held in place.

When multi-compartment resin cartridges are manufactured, such as in the form of partitioned film packages, a series of cartridges may be formed using a package-forming apparatus. The cartridges may be separated from one another at a clipping head associated with the package-forming apparatus, where the cartridges are cut from one another and sealed. Alternatively, a series of cartridges may be separated from one another in a different operation from the cartridge forming operation, i.e., off-line using a cutter separate from the clipping head. In particular, the cartridges may be separated from one another proximate their clipped ends, i.e., proximate the regions of the opposite ends of the cartridges which are each clipped so as to retain the resin and catalyst in the package. Thus, before being separated, adjacent cartridges have two clips adjacent each other with some cartridge packaging disposed therebetween. A cut is made between the adjacent clips to separate the cartridges.

U.S. Pat. No. 4,616,050 to Simmons et al. discloses filler-containing hardenable resin products. In particular, a hardenable resin composition is disclosed that is adapted for use in making set products, e.g., a hardened grout for anchoring a reinforcing member in a hole. A course/fine particulate inert solid filler component, e.g., limestone and/or sand, is used. In one composition, a resin component and a catalyst component are provided in a 70:30 percentage ratio. In one example, the resin component is describes as a mixture of 21% of a resin formulation and 79% filler (limestone or limestone in combination with sand). The base resin formulation consisted approximately of 64.0% of a polyester resin, 17.1% styrene, 14.2% vinyl toluene, 1.9% fumed silica, and 2.9% stabilizers and promoters. The polyester resin was the esterification product of maleic anhydride, propylene glycol, and diethylene glycol, the maleic anhydride having been partially replaced with phthalic anhydride (30% maleic anhydride, 23% phthalic anhydride, 17% propylene glycol, and 30% diethylene glycol). The catalyst component was a mixture of 72.5% filler (i.e., limestone), 19.1% water, 0.4% of methylcellulose, and 8.0% of a benzoyl peroxide (BPO) catalyst paste consisting, approximately, of 49.3% BPO, 24.7% butyl phenyl phthalate, 14.8% water, 7.9% polyalkylene glycol ether, 2.0% zinc stearate, and 1.3% fumed silica. Two grades of limestone were used as specified in Table A, and both "coarse" and "fine" filler particles were used. Examples of disclosed compositions are as follows:

TABLE A

| Product | Filler |
|---|---|
| Product I | Filler in Resin: [12.5% coarse particles and 87.5% fine particles]<br>38% "Grade A" limestone:<br>33% of the particles averaged larger than 1.19 mm (with 10% of these larger than 2.3 mm, 3% larger than 4.76 mm, and none larger than 9.53 mm); an average of 42% of the particles were smaller than 0.59 mm (with 17% smaller than 0.297 mm, and 5% smaller than 0.149 mm)<br>62% "Grade B" limestone:<br>an average of 99.8% of the particles were smaller than 0.84 mm, with 98.7% smaller than 0.297 mm, 97.9% smaller than 0.250 mm, 91.5% smaller than 0.149 mm, and 69.6% smaller than 0.074 mm<br>Filler in Catalyst:<br>100% Grade B limestone |
| Product II | Filler in Resin: [31.9% coarse particles and 68.1% fine particles]<br>38% sand:<br>83.9% of the particles averaged larger than 1.00 mm (with 59.6% of these larger than 1.19 mm); 6.6% of the particles averaged smaller than 0.84 mm (with 1.9% smaller than 0.59 mm, 0.8% smaller than 0.42 mm, and 0.2 smaller than 0.297 mm)<br>62% Grade B limestone<br>Filler in Catalyst:<br>100% Grade B limestone |
| Product III | Filler in Resin:<br>100% Grade B limestone<br>Filler in Catalyst:<br>100% Grade B limestone |
| Product V | Filler in Resin: [12.4% coarse particles, 87.6% fine particles]<br>37.5% Grade A limestone<br>62.5% Grade B limestone<br>Filler in Catalyst:<br>100% Grade B limestone |
| Product VI | Filler in Resin:<br>62.5% Grade B limestone<br>37.5% coarse sand |

TABLE A-continued

| Product | Filler |
|---|---|
| | all particles passed through a 3.18-mm screen and were held on a 1.59-mm screen<br>Filler in Catalyst:<br>100% Grade B limestone |

As used herein, the terms "grouting," "grouting system," "grout," and "grout system" mean a substance that hardens to anchor a reinforcing member in a space. For example, grouting can be provided in the form of a cartridge with a compartment housing a polyester resin and a compartment housing an initiator/catalyst, such that when the cartridge is shredded and the resin is mixed with the initiator/catalyst, a reinforcing member can be anchored in a space.

In manufacturing grouting, from a materials cost perspective, as more filler is used the cost becomes less expensive. In other words, the more filler used instead of actual resin or catalyst, the less expensive the materials required to form the composition. Moreover, filler permits better performance to be achieved by increasing the strength of the hardened grout. However, the tradeoff with using more filler in a composition is that the composition becomes more viscous. For example, the more that filler is used in the resin, the more difficult it is to pump the resin mastic into the package (cartridge) because the resin becomes "thick" (the viscosity increases). High resin mastic pumping pressures become necessary with such high viscosity compositions. Also, the more that filler is used in the overall grouting composition, the more difficult it becomes for the mine bolt to be able to penetrate the cartridge when spun.

In basic principle, when larger (e.g., coarse) filler particles are used in a composition, the particles overall provide lower surface area than when smaller (e.g., fine) particles are used. Use of such larger particles thus permits a lower viscosity grouting and advantageously aids in shredding of the cartridge and mixing of the cartridge components. In contrast, smaller (e.g., fine) particles can have a very substantial effect on viscosity of a composition because of the high overall surface area that they provide. The use of larger (e.g., coarse) filler particles involves other tradeoffs as well. The resin and catalyst are delivered to the packaging (cartridge) through so-called fill tubes, which are sized to be accommodated with respect to the compartments of the cartridge. The fill tubes thus can only be of a certain diameter in order to be used in the cartridge manufacturing process. The internal diameter of the fill tubes limits the size of the filler particles that can be delivered through those tubes. Separately, when cartridges are clipped at either end during the manufacturing process to seal the resin and catalyst within the cartridge, larger diameter particles can interfere with the clips, causing leakage of resin or catalyst proximate the cartridge free ends and/or rupture of the cartridge when the cartridge is squeezed during installation of a clip. The use of larger diameter filler particles thus can result in a higher rejection rate of manufactured product due to quality control. For these reasons, it is known that clipping requirements are a limiting factor in the filler particle size used in grouting. Prior art compositions, for example, have had a maximum particle size of 3/16 inch. But even then, if a particle of such maximum size is present proximate a clip, the cartridge typically ruptures and has to be discarded rather than sold. It is for this reason that during cartridge manufacture, only a small percentage of larger (e.g., coarse) filler particles are used (e.g., 0-5%) such that the number of rejected cartridges due to leakage and/or rupture remains tolerable (e.g., 1-2%).

It also needs scarcely to be emphasized that rolling diaphragm piston pumps and progressive cavity pumps for pumping resin mastic and catalyst mastic during manufacture of the cartridges are extremely expensive, costing on the order of several hundred thousand dollars each not including regular maintenance costs.

One significant problem with the use of such pumps for delivering resin mastic through a filler tube to the compartment of a cartridge is that the pumps typically are operated proximate their highest rated pressure (e.g., 1,250 psi or 1,000 psi). At such an elevated pressure, the speed at which cartridges may be produced is significantly limited. Thus, there exists a need for methods and apparatuses for decreasing the pressure at which the resin mastic pumps are operated in connection with cartridge compartment filling and concomitantly for increasing the speed at which the cartridges may be produced.

The concept of adding a layer of lubricant around a plug flow of high viscosity material, such as sludge or concrete, to lower pumping pressure and provide increased capability of pumping the material greater distances at a given pressure is known for example from U.S. Pat. No. 5,361,797 to Crow et al. However, the challenges associated with a sludge pipeline lubrication system specifically involve issues of long distance transport rather than a problem associated with packaging a resin mastic let alone with a small diameter fill tube of changing cross-sectional shape (e.g., a portion of the length of the fill tube may have a circular cross-section while another portion may have a D-shaped cross-section; this is because of the shape of the shape of the compartment in the cartridge, as shown for example in U.S. Pat. No. 7,681,377 B2 to Simmons et al.). In yet another context, the outer surface of submarines may be lubricated by bubbles of hot air and oil vapor exhaust. But again, the challenges associated with moving a vessel the size of a submarine through the ocean are quite different from the problems associated with delivering resin mastic through a small diameter fill tube.

Given that the use of fillers was contemplated in resins for mine bolt grouting since at least the mid-1960s, e.g., as disclosed in U.S. Pat. No. 3,731,791 to Fourcade et al., there has been a long-felt but unsolved need for methods and apparatuses for decreasing the pressure at which the resin mastic pumps are operated in connection with delivering the resin mastic to the cartridge compartment and concomitantly for increasing the speed at which the cartridges may be produced.

SUMMARY OF THE INVENTION

A method of forming a partitioned package for grouting for an anchoring system for a mine includes: pumping a mastic into the package through a fill tube while a processing lubricant is separately introduced onto an inner wall of the fill tube. The mastic may be a resin mastic or a catalyst mastic. A progressive cavity pump may be used for the pumping.

The processing lubricant may have less than 60% by weight of filler therein. In some embodiments, the mastic may have 70% to 98% of filler.

The processing lubricant may include bentonite.

In some embodiments, the mastic may be a resin mastic and the processing lubricant may be selected from the group consisting of mineral oil, petroleum oil, diethylene glycol, water-soluble cellulose ether, water, hydroxyethyl cellulose in water, unsaturated polyester resin in styrene, gypsum in water, calcium carbonate in water, and sodium bentonite in water.

The processing lubricant may have from 0 wt % to 20 wt % of filler, and in some embodiments the processing lubricant may have from 0 wt % to 10 wt % of filler.

In some embodiments, the processing lubricant may be substantially free of filler.

The processing lubricant may be introduced at a flow rate that is from 0.1% to 10% of the flow rate of the mastic at a free end of the fill tube from which mastic is delivered to the package.

The processing lubricant may include a colorant which for example may be a pigment.

The weight percent of filler in the processing lubricant may be no greater than the weight percent of filler in the mastic prior to being in contact therewith.

Filler in the processing lubricant may have a lower Turner Sclerometer hardness than filler in the resin mastic.

Pumping pressure of the mastic flowing adjacent processing lubricant may be at least 50% lower than pumping pressure of the mastic without processing lubricant adjacent thereto.

Flow of the mastic flowing adjacent processing lubricant may be at least 50% greater than flow of the mastic without processing lubricant adjacent thereto at a given pumping pressure.

DETAILED DESCRIPTION OF THE PREFERRED EMBODIMENTS

As used herein, the term "mastic" means liquid component with filler. For example, there can be resin mastic (liquid component plus filler) as well as catalyst mastic (liquid component plus filler).

As used herein, the terms "catalyst" and "initiator" mean a substance that initiates polymerization and optionally is consumed during polymerization.

In an exemplary embodiment, a compartment of a multi-compartment cartridge is filled with resin mastic by lubricating the inner wall of a fill tube with a processing lubricant. The processing lubricant may be selected, for example, from a variety of fluids such as mineral oil, SAE 30 motor (petroleum) oil ("Oil #30"), diethylene glycol ("DEG"), methylcellulose and hypromellose water-soluble cellulose ethers (e.g., Dow Chemical Company's METHOCEL™), water, water with a gelling/thickening agent such as hydroxyethyl cellulose ("HEC"), unsaturated polyester resin in styrene ("Resin"; e.g., Reichhold Polylite® 32332-10) that may be promoted to reduce gel time between 5 s to 240 s, gypsum (calcium sulfate dihydrate) mixed in water (to form a slurry) in an amount to provide a stable, nonsettling solution with a higher viscosity than water, calcium carbonate in water, or bentonite (a clay) mixed in water (to form a slurry) in an amount to provide a stable, nonsettling solution with a higher viscosity than water (e.g., agricultural grade bentonite, or Optigel® WH unmodified sodium bentonite from Southern Clay Products, Inc. having a density of 21.7 lb/gal, a bulking value of 0.0461 gal/lb, a maximum moisture of 6%, and a particle size with 90% of the particles being less than 325 mesh).

In some embodiments, other processing lubricants for example may be selected from carboxymethylcelluloses, polyvinyl alcohols, starches, carboxy vinyl polymers, and other mucilages and resins such as galactomannans (e.g., guar gum), polyacrylamides, and polyethylene oxides. Potential gelling/thickening agents are listed in U.S. Pat. No. 4,280,943, the entire content of which is hereby incorporated by reference herein.

Potential resins for use with the systems as described herein include, but are not limited to, polyester with a styrene monomer cross-linking agent as well as acrylates and acrylic resins and combinations thereof, unsaturated polyester resins dissolved in a suitable ethylenically unsaturated monomer or mixture of monomers such as styrene, alpha methyl styrene, vinyl toluene, and methyl methacrylate. Potential resins are provided in U.S. Pat. No. 3,731,791 to Fourcade et al. entitled "Securing of Fixing Elements Such as Anchor Bolts" and U.S. Pat. No. 7,411,010 B2 to Kish et al. entitled "Composition for Anchoring a Material in or to Concrete or Masonry," the entire contents of which are incorporated herein by reference thereto.

A colorant such as a pigment or dye may be included in the processing lubricant such as for ease in identifying that the lubricant is being dispensed into the fill tube.

Advantageously and unexpectedly, the use of processing lubricant permits a substantial decrease in the pump pressure necessary for pumping resin mastic. Such a decrease in pump pressure has numerous benefits. First, the lower pumping pressure permits a substantially greater production speed for cartridges. While operating the resin mastic pump proximate its highest rated pressure (e.g., 1,250 psi or 1,000 psi) has heretofore been the speed limiting factor in cartridge production, at lower pressures a much higher cartridge production rate is possible with the pump no longer serving as the limiting factor (the ability of personnel on the production line to handle the cartridges at higher production rates may be a limiting factor). Second, rolling diaphragm or progressive cavity pumps typically are used for pumping resin mastic for filling cartridges. Without lubricant on the wall of the fill tube, pumps capable of on the order of 1,000 psi are needed to deliver the resin mastic into the compartment of the film cartridge. This is because the fill tube used to deliver the resin mastic into the compartment has a small size (e.g., an outer diameter of 0.75 inch with a wall thickness of 0.062 inch) and a length of 12 to 40 inches. Such a pump rated for 1,000 psi is not off-the-shelf, and thus may be quite expensive (on the order of several hundred thousand dollars). By substantially decreasing the required pump pressure, readily available progressive cavity pumps may be acquired at a small fraction of the cost for pumping the resin mastic and the cost of pump maintenance concomitantly is lowered as well. The cost savings realized by using lower pressure pumps is considerable particularly when several production lines, each having separately pumped resin mastic, are run as occurs in commercial operations.

Table I below provides test results for the use of the following processing lubricants: mineral oil, Oil #30, DEG, water, water thickened with HEC, and unsaturated polyester resin in styrene (Reichhold Polylite® 32332-10) promoted to reduce gel time between 5 s to 240 s. Testing was conducted using a rolling diaphragm piston pump initially operating at about 1,000 psi to deliver resin mastic through piping to a fill tube and subsequently into a compartment of a multi-compartment cartridge at a flow rate of 9.7 kg/min. Processing lubricant was introduced onto the inner wall of the resin mastic stainless steel fill tube at about 30 inches from the distal end thereof (the fill tube having an overall length of 37.25 inches). Pumping pressure was measured using a pressure gauge located at the discharge of the rolling diaphragm piston pump. The rate of injection of processing lubricant onto the inner surface of the fill tube was increased from 20 g/min. to 105 g/min. while the flow of resin mastic (a mixture of 80-86% limestone filler and 14-20% Polylite 32332-10) was held constant at 9.7 kg/min. Testing results are not included for up to 20 g/min. due to pressure instabilities when using lower flow rates of processing lubricant.

TABLE I

| FLOW OF PROCESSING LUBRICANT (g/min.) | MINERAL OIL (psig) | OIL #30 (psig) | DEG (psig) | THICK WATER 1.4% HEC (psig) | THICK WATER 0.7% HEC (psig) | THICK WATER 0.35% HEC (psig) | RESIN (psig) | WATER (psig) |
|---|---|---|---|---|---|---|---|---|
| 0 | 1,000 | 1,000 | 1,000 | 1,000 | 1,000 | 1,000 | 1,000 | 1,000 |
| 20 | 215 | 197 | 463 | | | | 950 | unstable |
| 27 | 212 | 184 | 460 | | | | 925 | unstable |
| 55 | 219 | 182 | 410 | 183 | 200 | 218 | 900 | unstable |
| 105 | 217 | 220 | 315 | 175 | 200 | 200 | 825 | unstable |
| 213 | 230 | | | | | | | unstable |

As seen in Table I, each of the processing lubricants permitted pumping of resin mastic at a pressure lower than the 1,000 psi reached when not using such processing lubricants. The Resin processing lubricant provided the least decrease in pumping pressure, while each of the other lubricants, at a given flow, permitted about a 50% to about an 85% decrease in pump pressure to be realized. While mineral oil tested well, however, in terms of decreasing required pumping pressure for the resin mastic, it was found to leak from within the sealed cartridges that were produced during testing such that a slippery coating formed on the outside of the cartridges. Thus, mineral oil was determined to not be a preferred choice of processing lubricant due to the issues it caused with cartridge handling.

Turning next to Table II, test results are provided for pumping with a processing lubricant Optigel® WH unmodified sodium bentonite from Southern Clay Products, Inc. (a clay) mixed in water in an amount to provide a stable, nonsettling solution with a higher viscosity than water. Table II shows a % packaging rate increase from a baseline of 18 m/min. achievable without the use of processing lubricant. Processing lubricant was introduced at a constant flow rate of 83 g/min., whereas the table shows delivery of resin mastic at varying flow rates. The ratio of processing lubricant to resin mastic being pumped is calculated, for example, by dividing the flow rate of 83 g/min. of processing lubricant by the flow rate of 9.1 kg/min. of resin mastic.

At a packaging speed (cartridge production speed) of 18 m/min., production of cartridges was limited by the high pump pressure (1,000 psi). However, through the use of processing lubricant on the inner wall of the resin mastic fill tube, a decrease of more than 70% in required pump pressure was realized. Such a decreased pump pressure advantageously permits faster production because more resin can be pumped through the fill tube per unit time. Sodium bentonite thus is an exemplary preferred processing lubricant in view of the test results.

The testing for which data is listed in Table II was conducted using a rolling diaphragm piston pump initially operating at about 1,000 psi to deliver resin mastic through piping to a fill tube and subsequently into a compartment of a multi-compartment cartridge. Processing lubricant was introduced onto the inner wall of the resin mastic stainless steel fill tube at about 30 inches from the distal end thereof (the fill tube having an overall length of 37.25 inches). Pumping pressure was measured using a pressure gauge located at the discharge of the rolling diaphragm piston pump.

TABLE II

| PACKAGING SPEED (m/min.) | DISCHARGE PRESSURE OF RESIN MASTIC PUMP (psig) | RATIO OF PROCESSING LUBRICANT TO RESIN MASTIC BEING PUMPED (%) | % PACKAGING RATE INCREASE |
|---|---|---|---|
| 18.00 | 1000 | 0.00 | 0.00 |
| 18.00 | 292 | 0.91 | 0.00 |
| 18.00 | 307 | 0.91 | 0.00 |
| 18.25 | 330 | 0.90 | 1.39 |
| 18.50 | 340 | 0.88 | 2.78 |
| 18.75 | 360 | 0.86 | 4.17 |
| 19.00 | 360 | 0.85 | 5.56 |
| 19.50 | 363 | 0.84 | 8.33 |
| 19.75 | 370 | 0.83 | 9.72 |
| 20.00 | 392 | 0.81 | 11.11 |
| 20.25 | 408 | 0.79 | 12.50 |
| 20.50 | 413 | 0.78 | 13.89 |
| 20.75 | 441 | 0.75 | 15.28 |
| 20.75 | 440 | 0.75 | 15.28 |
| 21.00 | 440 | 0.75 | 16.67 |
| 21.00 | 450 | 0.75 | 16.67 |
| 21.50 | 460 | 0.73 | 19.44 |
| 22.00 | 486 | 0.72 | 22.22 |
| 22.25 | 495 | 0.70 | 23.61 |
| 22.50 | 502 | 0.69 | 25.00 |
| 22.75 | 514 | 0.69 | 26.39 |
| 23.00 | 515 | 0.68 | 27.78 |
| 23.00 | 520 | 0.68 | 27.78 |
| 23.25 | 520 | 0.67 | 29.17 |

To summarize the results of Table II, it can be seen that at a production rate of 18.0 m/min., the pump pressure is 1000 psi. Such a pump pressure limits production because to pump resin mastic any faster would require an increase to a pressure at which resin mastic pumps are not typically operated. When a small amount of bentonite mixed in water was added in the fill tube at a rate of 83 g/min., the pump pressure dropped to 292 psi (more than a 70% drop from 1,000 psi). Such a substantial decrease in the pump pressure is quite surprising. The lower pump pressure, in turn, permitted the production rate to be increased from 18.0 to 24.0 m/min. (a 33% increase) while pump pressure remained extremely low (560 psi). An even greater production increase was possible, but limited by the ability of personnel handling the cartridges to keep pace with the increased production rate.

Moreover, through the use of processing lubricant, an additional increase in pumping rate can be realized because the reduced operating pressure within the fill tube means that a thinner-walled tube with greater cross-sectional area for flow may be used. Concomitantly, such thinner-walled tubes are lighter and less expensive.

Filler tubes are difficult to replace and such maintenance can result in significant loss in production. Advantageously, the use of processing lubricant can allow for a longer lifetime of the filler tubes to be realized due to slower wear of the tubes. In prior art packaging systems, the fill tubes have significant wear problems such that their regular replacement is necessary (e.g., once per month). However, through the use of processing lubricant, it is possible to significantly extend the lifetime of the fill tubes. The lifetime can be further increased by using processing lubricants that have no filler or fillers with a hardness less than the hardness of the filler in the mastic.

The use of processing lubricants as described herein with respect to the flow of resin mastic in fill tubes also is applicable to the flow of catalyst mastic in fill tubes. Fill tubes for catalyst mastic typically are smaller in cross-sectional area than fill tubes used for resin mastic as disclosed herein. The reason such fill tubes are smaller is because there is generally less weight of catalyst mastic than resin mastic in a cartridge. For example, a cartridge may have 30 wt % of catalyst mastic and 70 wt % of resin mastic. Nevertheless, processing lubricants still permit a substantial decrease in pump pressure to be realized for pumping catalyst through a fill tube using rolling diaphragm or progressive cavity pumps.

Potential catalysts for use with processing lubricants described herein include, but are not limited to, peroxide types such as benzoyl peroxide (BPO) with a water or oil base. Other such initiators include cyclohexane peroxide, hydroxy heptyl peroxide, 1-hydroxy cyclohexyl hydroperoxide-1, t-butyl hydroperoxide, 2,4-dichlorobenzoyl peroxide and the like, methyl ethyl ketone peroxide as well as inorganic peroxides alone or mixed with organic peroxides, such as sodium percarbonate, calcium peroxide, and sodium peroxide. Potential initiators are listed in U.S. Pat. No. 3,324,663 to McLean entitled "Rock Bolting," the entire content of which is incorporated herein by reference thereto.

While various descriptions of the present invention are described above, it should be understood that the various features can be used singly or in any combination thereof. Therefore, this invention is not to be limited to only the specifically preferred embodiments depicted herein.

Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. A method of forming a partitioned package for grouting for an anchoring system for a mine comprising: pumping a mastic into the package through a fill tube while a processing lubricant is separately introduced onto an inner wall of the fill tube, wherein the mastic is a resin mastic or a catalyst mastic and wherein the processing lubricant is selected from the group consisting of mineral oil, petroleum oil, diethylene glycol, water-soluble cellulose ether, hydroxyethyl cellulose in water, unsaturated polyester resin in styrene, gypsum in water, calcium carbonate in water, sodium bentonite in water, polyvinyl alcohols, starches, carboxy vinyl polymers, galactomannans, polyacrylamides, and polyethylene oxides, wherein a ratio of a rate of injection of the processing lubricant to a rate of injection of the mastic is equal to or less than 0.9%, and wherein a pumping pressure of the mastic flowing adjacent the processing lubricant is at least 50% lower than a pumping pressure of the mastic without the processing lubricant adjacent thereto.

2. The method of claim 1, wherein a progressive cavity pump is used for the pumping.

3. The method of claim 1, wherein the processing lubricant has less than 60% by weight of filler therein.

4. The method of claim 1, wherein the mastic comprises 70% to 98% of filler.

5. The method of claim 1, wherein the processing lubricant comprises bentonite.

6. The method of claim 1, wherein the processing lubricant has from 0 wt % to 20 wt % of filler.

7. The method of claim 1, wherein the processing lubricant has from 0 wt % to 10 wt % of filler.

8. The method of claim 1, wherein the processing lubricant is substantially free of filler.

9. The method of claim 1, wherein the processing lubricant includes a colorant.

10. The method of claim 9, wherein the colorant is a pigment.

11. The method of claim 1, wherein the weight percent of filler in the processing lubricant is no greater than the weight percent of filler in the mastic prior to being in contact therewith.

12. The method of claim 1, wherein filler in the processing lubricant has a lower Turner Sclerometer hardness than filler in the resin mastic.

13. The method of claim 1, wherein flow of the mastic flowing adjacent processing lubricant is at least 50% greater than flow of the mastic without processing lubricant adjacent thereto at a given pumping pressure.

* * * * *